(12) United States Patent
Weiβ et al.

(10) Patent No.: US 7,566,403 B2
(45) Date of Patent: Jul. 28, 2009

(54) PROCESS FOR ELIMINATING NITROGENOUS ORGANIC COMPOUNDS FROM SALT-CONTAINING WATER

(75) Inventors: Thomas Weiβ, Ilvesheim (DE); Peter-Roger Nyssen, Dormagen (DE); Horst Bertram, Köln (DE); Gunther Stolp, Köln (DE); Paul Wagner, Düsseldorf (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 12/004,648

(22) Filed: Dec. 21, 2007

(65) Prior Publication Data

US 2008/0210640 A1    Sep. 4, 2008

(30) Foreign Application Priority Data

Jan. 22, 2007    (DE)    ........................ 10 2007 004 164

(51) Int. Cl.
*C02F 1/68* (2006.01)
(52) U.S. Cl. ..................................... 210/761
(58) Field of Classification Search .................. 210/761
See application file for complete search history.

(56) References Cited

U.S. PATENT DOCUMENTS

| | | | |
|---|---|---|---|
| 3,779,909 A | 12/1973 | Wisfeld et al. ................. | 210/29 |
| 4,056,469 A | 11/1977 | Eichenhofer et al. .......... | 210/62 |
| 5,221,486 A * | 6/1993 | Fassbender ................... | 210/757 |
| 6,153,151 A | 11/2000 | Moxley et al. .......... | 422/186.07 |
| 6,423,236 B1 * | 7/2002 | Shiota et al. ................. | 210/761 |

FOREIGN PATENT DOCUMENTS

| | | |
|---|---|---|
| EP | 1243562 | 9/2002 |
| GB | 1 518 117 | 7/1978 |
| JP | 54042851 A * | 4/1979 |
| JP | 04 145997 | 5/1992 |
| WO | WO 00/78682 | 12/2000 |

OTHER PUBLICATIONS

R. Munter et al., "Advanced Oxidation Processes (AOPs): Water Treatment Technology for the Twenty-first Century", Kemia-Kemi vol. 28 (2001) 5.

(Continued)

*Primary Examiner*—Chester T Barry
(74) *Attorney, Agent, or Firm*—Michael A. Miller

(57) ABSTRACT

The invention relates to a process for eliminating nitrogenous organic compounds from a salt-containing water which contains more than 0.5% by weight of salt in the form of $CaCl_2$ or NaCl, less than 200 ppm of dissolved carbonic acid or carbonates and more than 50 ppm of nitrogenous organic compounds, by treating the water by wet oxidation at a temperature of below 100° C. with chlorine or a chlorine-containing oxidizing agent and feeding this, preferably after additional oxidation with a gaseous oxidizing agent and/or by adsorption with an adsorbent, to an electrolysis for producing chlorine and/or sodium hydroxide solution.

10 Claims, 1 Drawing Sheet

OTHER PUBLICATIONS

J. Fehn, K. Held, Wasser Abwasser, 136 (1995) No. 6.
R. Hernandez et al., Journal of Hazardous Materials 92 (2002) 33-55.
"Ullmann's Encyclopedia of Industrial Chemistry", 2002, Wiley-VCH-Verlag GmbH und Co. KGaA lines 1-15.
Oliviero R., et al., "Wet Air Oxidation of Nitrogen-Containing Organic Compounds and Ammonia in Aqueous Media", Applied Catalysis B Environmental, vol. 40, (2003), pp. 163-184.
Kolaczkowski, S., et al.; "Wet Air Oxidation: A Review of Process Technologies and Aspects in Reactor Design", Chemical Engineering Journal, vol. 73, (1999), pp. 143-160.
Luck, F.; "Wet Air Oxidation: Past, Present and Future", Catalysis Today, vol. 52, (1999), pp. 81-91.
Mishra, V., "Wet Air Oxidation", Industrial Engineering Chemical Resources, vol. 34, (1995), pp. 2-48.

* cited by examiner

PROCESS FOR ELIMINATING NITROGENOUS ORGANIC COMPOUNDS FROM SALT-CONTAINING WATER

The invention relates to a process for eliminating nitrogenous organic compounds from a salt-containing water which contains more than 0.5% by weight of salt in the form of $CaCl_2$ or NaCl, less than 200 ppm of dissolved carbonic acid or carbonates and more than 50 ppm of nitrogenous organic compounds, characterized in that the water is treated by wet oxidation at a temperature of below 100° C. with chlorine or a chlorine-containing oxidizing agent which is used more than 10% above the titrimetrically determined stoichiometric demand. In a preferred embodiment, the wastewater treated by wet oxidation is additionally treated with a gaseous oxidizing agent and/or subjected to adsorption with an adsorbent. The result of this process, carried out in particular with additional oxidation by means of a gaseous oxidizing agent and/or adsorption with an adsorbent, is a salt-containing wastewater having a total nitrogen content of less than 10 ppm and a TOC content of less than 10 ppm. This enables the wastewater to be fed directly to chlor-alkali electrolysis for producing chlorine and/or sodium hydroxide solution. The invention further relates to a process for producing chlorine and/or sodium hydroxide solution by electrolysis, characterized in that the water treated in the above manner is treated by oxidation with a gaseous oxidizing agent and/or by adsorption with an adsorbent. The invention further relates to the use of the salt-containing water treated by wet oxidation and subsequently the water treated with gaseous oxidizing agent and/or water treated by adsorption with an adsorbent for producing chlorine and/or sodium hydroxide solution by means of chlor-alkali electrolysis.

BACKGROUND OF THE INVENTION

Many processes for the breakdown of organic compounds in water by means of oxidation are generally known, just as are processes of adsorption of organics onto adsorbents, preferably activated carbon. In addition, processes for ultrafiltration or extraction are known.

Processes such as that of the present invention are customarily used in combination with a biological wastewater treatment when this concerns the elimination of poorly biodegradable or nonbiodegradable organic pollutants. In this Case, in Particular Oxidation Processes as wastewater pretreatment serve for the conversion of nonbiodegradable or poorly biodegradable compounds into compounds which are degradable by bacteria. A complete elimination of the organic compounds, that is to say from a high initial TOC (total organic carbon) of greater than 50 ppm, in particular from 100 to 2000 ppm, to TOC values of less than 10 ppm, on the basis of exclusively one of the abovementioned processes, or a combination of a plurality of the abovementioned processes, is not known.

EP-A 1 243 562 describes a combination of processes for eliminating organic compounds and nitrogenous organic compounds consisting of a first denitrification stage in the form of wet oxidation at 180-300° C. in a strongly acidic environment with the co-presence of a dinitrification agent in the form of a nitrate salt of an aliphatic or aromatic amine, and a second stage for TOC elimination. The latter can be adsorption, oxidation or neutralization and biological treatment. This produces a TOC elimination of 94%, or a TOC residual content of a maximum of 18 ppm.

A combination of important oxidation methods may be found, for example, in R. Munter et al., "Advanced Oxidation Processes (AOPs): Water Treatment Technology for the Twenty-first Century", Kemia-Kemi Vol. 28 (2001) 5. In addition, therein the use of ozone, hydrogen peroxide in combination with one another and/or with UV irradiation and catalysts for generating hydroxyl radicals is described and they are compared with one another (theoretically). However, no indications can be obtained for the application of these processes to waters containing salt or additionally containing nitrogenous organic compounds.

In J. Fehn, K. Held, Wasser Abwasser, 136 (1995) No. 6 there is a description of ozonolysis, in particular in combination with $H_2O_2$, applied to poorly biodegradable industrial waters having a chloride content of 25 mg/l. Emphasis is given to the more efficient ozone consumption and the higher TOC degradation rate with elevation of the pH from neutral to pH 11.5. However, the initial TOC content was only 55 mg/l and nitrogenous organic compounds were not present. Reference is made to the interfering effect of hydrogencarbonate, likewise to the high capital costs and operating costs of ozonolysis.

In R. Hernandez et al., Journal of Hazardous Materials 92 (2002) 33-55, AOP methods such as UV, $O_3$, $UV/O_3$, $UV/H_2O_2$ and also $H_2O_2/O_3$ on wastewater contaminated with 5 ppm of acetone are compared. Degradation of the ketone of 99% was only achieved with the combination of $UV/O_3$, ozonolysis alone resulted in less than 40%. Nitrogenous organic compounds or salts were not additionally present.

An industrial ozonolysis procedure can be taken, for example, from U.S. Pat. No. 6,153,151.

WO 00/78682 describes a process for treating with ozone a wastewater from polycarbonate production containing more than 2 ppm of TOC and at least 0.1% by weight of dissolved carbonic acid or carbonates. The wastewater thus treated is said to be suitable for direct introduction into surface waters, but in particular, in the event that the wastewater contains dissolved common salt, to be suitable for reuse for producing chlorine by electrolysis. The TOC content of the water before the treatment is a maximum of 28 mg/l (comparative example), that is to say very low; the decisive organic compounds are phenols and amines. In contrast to the teaching from J. Fehn (see above) it is emphasized that in the neutral pH range significantly better TOC degradation takes place than at pH 12 (comparative examples). This is explained by the co-presence of carbonates. It cannot be gathered from WO 00/78682 whether high proportions of nitrogenous organic compounds, in particular from the group of azines and derivatives thereof, can also be completely eliminated by means of ozonolysis. Likewise there is no indication of residual nitrogen remaining which, as is generally known, must only occur in very low amounts of at most 10 ppm in electrolysis.

The prior art for use of common salt solutions in electrolysis processes is that the content of organic compounds and of organic/inorganic nitrogen must be so low that no impairment of the electrolysis itself and the service lives of the associated process components such as, for example, the membranes and/or the brine filtration and brine workup can occur. The common salt solution used in chlor-alkali electrolysis must therefore generally contain no more than 10 ppm of TOC when the diaphragm or amalgam electrolysis process is employed. When the membrane process is used, still lower TOC limiting values are required. The total nitrogen content must in all cases likewise be <10 ppm, in particular less than 1.0 ppm.

The production of chlorine and sodium hydroxide solution by electrolysis of common salt in aqueous solution can be gathered, for example, from Ullmann's Encyclopedia of Industrial Chemistry, Vol. A 6, 5th Edition 1986, pp. 401-477. Extensive details can also be gathered from "Referenzdokument fiber die besten verfügbaren Techniken in der Chloralkaliindustrie" [Reference document on the best available techniques in the chlor-alkali industry], December 2001, Umweltbundesamt (German Federal Environmental Agency).

An object of the present invention was therefore the provision of a process as economical as possible for the substantially complete elimination of nitrogenous organic compounds from a salt-containing water having a high content of nitrogenous organic compounds before the treatment and also providing a salt-containing water resulting therefrom which is suitable not only for introduction into surface waters, but can also be fed to use of the dissolved salt for producing chlorine and/or sodium hydroxide solution by electrolytic processes.

SUMMARY OF THE INVENTION

Surprisingly, it has been found that a virtually complete elimination of nitrogenous organic compounds by means of adsorption or ozonolysis is achieved when the water is previously treated in a wet oxidation with chlorine or a chlorine-containing oxidizing agent.

The object is achieved by, and therefore the present invention relates to, a process for eliminating nitrogenous organic compounds from a salt-containing water which contains more than 0.5% by weight of salt in the form of $CaCl_2$ or NaCl, less than 200 ppm of dissolved carbonic acid or carbonates and more than 50 ppm of nitrogenous organic compounds, characterized in that the water is treated by wet oxidation at a temperature of below 100° C. with chlorine or an aqueous, chlorine-containing oxidizing agent which is used more than 10% above the titrimetrically determined stoichiometric demand, and the water, in a preferred embodiment, is subsequently treated by oxidation with a gaseous oxidizing agent and/or by adsorption with an adsorbent.

Surprisingly, the process according to the invention produces a salt-containing wastewater having a total nitrogen content ($N_{tot}$) of less than 10 ppm which permits it to be fed directly to a chlor-alkali electrolysis. Preferably, the salt-containing water to be treated contains more than 2% by weight of salt, less than 50 ppm of dissolved carbonic acid or carbonates and more than 150 ppm of nitrogenous organic compounds.

According to the invention there is no restriction with respect to the nitrogenous organic compounds. In particular, however, these are taken to mean compounds from the group of azines, organic amines, pyrazolines, hydrazones, hydrazines, diazirines, diaziridines or oximes and derivatives thereof.

Nitrogenous organic compounds which are particularly relevant to the process according to the invention are obtained, for example, in the wastewater from plants for producing hydrazine hydrate.

Hydrazine hydrate is produced industrially from aqueous solutions of ammonia and an oxidizing agent such as sodium hypochlorite or hydrogen peroxide, in the presence of a carbonyl compound.

Processes for producing hydrazine hydrate are known and can be gathered, for example, from "Ullmann's Encyclopedia of Industrial Chemistry", 2002, Wiley-VCH-Verlag GmbH und Co. KGaA lines 1-15. According to this, technical hydrazine is obtained, first as derivatives, from which it can readily be obtained with good yield by hydrolytic cleavage. Suitable hydrazine derivatives are, in particular, low-molecular-weight azines such as, for example, acetone azine and methyl ethyl ketone azine.

The known process is, in particular, what is termed the "Bayer ketazine process" (=Bayer acetone Raschig process) which is based on the oxidation of ammonia by sodium hypochlorite. This process can be gathered, for example, from U.S. Pat. No. 3,077,383, according to which the reaction of ammonia and sodium hypochlorite proceeds with the simultaneous presence of a carbonyl compound. The resultant azines and/or hydrazones are separated by distillation in this process as an aqueous solution from the obligatorily produced sodium chloride and are worked up to hydrazine, for example in the form of "acid hydrolysis" by treatment with an acid. DE-A 1 130 797 sets forth a further improved process according to which aqueous ketazine and/or hydrazone solutions are rectified in a column at elevated pressure and elevated temperature and in this process are hydrolytically cleaved into the ketone at the top of the column and aqueous ketone-free hydrazine solution at the bottom of the column.

DETAILED DESCRIPTION OF THE INVENTION

Figure 1:
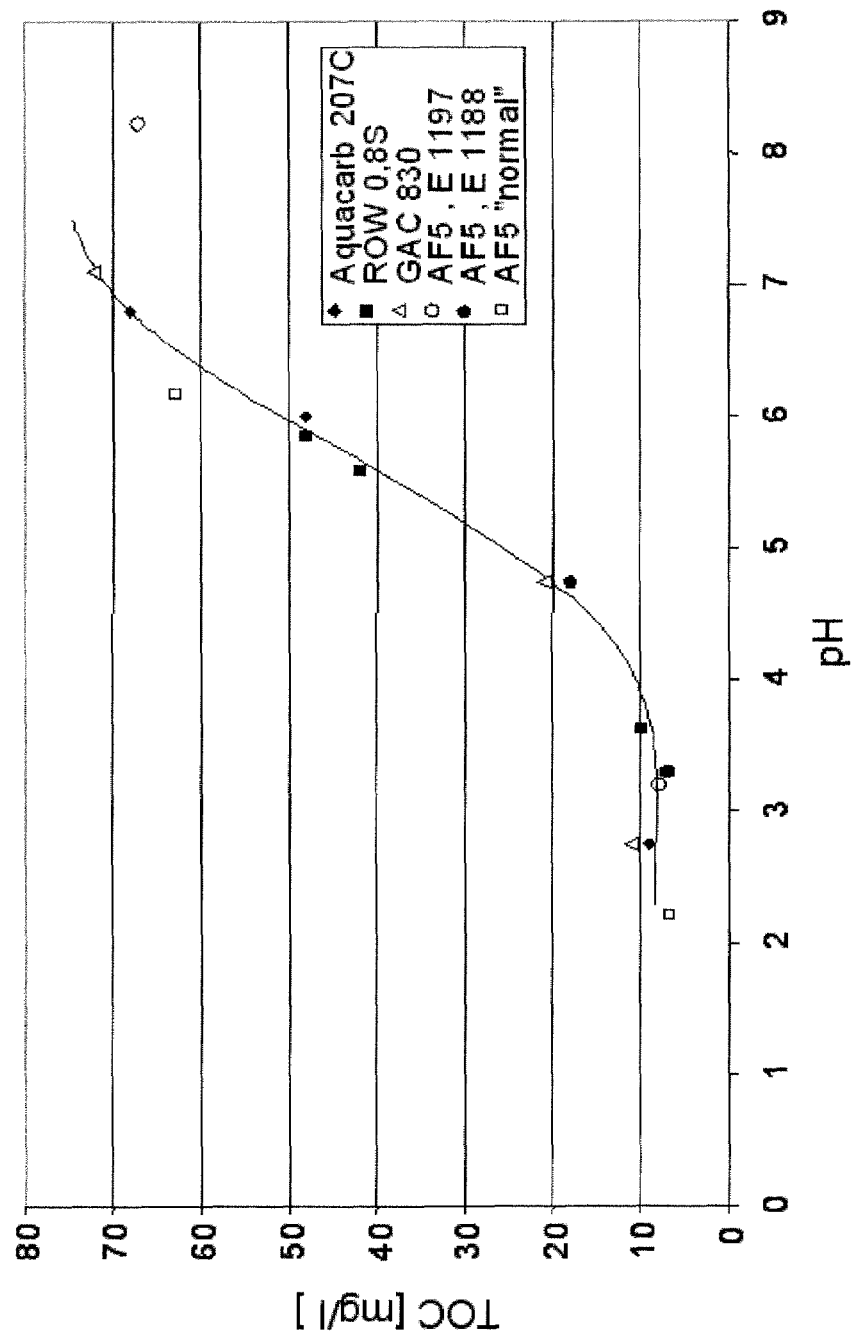
FIG. 1 graphically illustrates a relationship between TOC and pH for the materials listed in the drawing inset legend.

In this process, according to the invention there is produced water to be treated as 2-14% strength, preferably 8-12% strength, aqueous solution of sodium chloride containing as further components:

1. TOC in a range from 100 to 10000 ppm,
2. total nitrogen $N_{tot}$ in a range from 50 to 10000 ppm, containing nitrogenous organic compounds, $N_2H_4 \cdot H_2O$, ammonium and $NO_x$, where X is an integer 2 or 3,
3. carbonates or carbonic acid.

Nitrogenous organic compounds which are preferred according to the invention therein are dimethylhydrazone, dimethylketazine, isopropylhydrazone, acetone oxime, 3,5,5-trimethylpyrazoline, or pinacoline hydrazone.

The content of nitrogenous organic compounds is dependent on the process conditions in the abovedescribed process for producing hydrazine hydrate. Generally it is more than 50 ppm, preferably more than 150 ppm, and in particular more than 250 ppm. In addition, 100 to 10000 ppm, preferably 200 to 2000 ppm, of hydrazine hydrate can be present; in addition, nitrogen-free organic compounds, particularly said carbonyl compounds, and derivatives thereof, in particular acetone, isopropanol, methanol, pinacoline and also degradation products and derivatives of these compounds can be present in the water. The content of these nitrogen-free organic compounds, is generally more than 10 ppm, preferably more than 100 ppm. Finally, other inorganic nitrogenous compounds can be present in the water, in particular ammonium and/or ammonia at the level of more than 5 ppm, preferably more than 10 ppm. The proportion of carbonic acid or dissolved carbonate present in the water from the hydrazine synthesis process is low and is less than 200 ppm, in particular less than 50 ppm. The AOX content is less than 10 ppm, in particular less than 1 ppm. By means of the process according to the invention, it is possible to eliminate successfully also all organic compounds (TOC) and inorganic nitrogenous compounds including hydrazine hydrate and ammonia in the wastewater of such hydrazine plants known from the prior art, in particular to reduce the total nitrogen content ($N_{tot}$) and the TOC content in each case to less than 10 ppm.

The content of carbon present in the form of organic compounds is termed Total Organic Carbon (TOC). The determination is performed on the basis of DIN 38409-H3 via a measurement of the total content of organic and inorganic carbon (Total Carbon "TC") and a measurement of the content of inorganic carbon (Total Inorganic Carbon, TIC) in accordance with the following equation:

TOC=TC-TIC

This method is very reliable in particular when the TIC value is significantly less than the TC value.

The total nitrogen content ($N_{tot}$) corresponds to the content of total bound nitrogen ($TN_b$) and determination is performed as specified in DIN 38409-H27. The parameter $TN_b$ is defined in this case as the sum of organic nitrogen, ammonium, nitrite and nitrate nitrogen, calculated as N, and is equivalent to total nitrogen ($N_{tot}$).

The adsorbable organic halogens (AOX) are determined as specified in DIN 38409-H14.

According to the invention, there is no restriction with respect to the salts present in the water to be treated. In particular, other waters containing nitrogenous organic compounds can be treated with the process which contain, for example, other salts as a result of neutralization. However, preferred salts are $CaCl_2$ and NaCl, particularly preferably NaCl.

Wet oxidation is performed using elemental chlorine in liquid or gaseous form or with a chlorine-containing oxidizing agent, preferably with sodium hypochlorite (NaOCl) as a 5-18% strength aqueous solution, at a pH of 2-12, preferably 6-9. The temperature is 20-95° C., preferably 30-80° C., in particular 50-70° C. The amount of NaOCl or chlorine to be used depends on the amount of oxidative components. This amount can be determined by means of titrimetric methods. It is advantageous according to the invention to use an excess of NaOCl. Subsequently to the wet oxidation, if appropriate stripping of the volatile organic compounds and nitrogen compounds can be performed. The stripping can be performed by means of air, or in a steam-heated distillation column, wherein preferably an amount of less than 20% by weight, in particular less than 15% by weight, of distillate, based on the amount of water to be treated, is condensed and separated off. Before or during the wet oxidation, a pH adjustment can be necessary. In particular when the water fed, preferably from the hydrazine hydrate production process, has a pH greater than 12, according to the invention the pH is adjusted using an inorganic acid, preferably hydrochloric acid, having a TOC of less than 10000 ppm, preferably less than 2000 ppm. For example, oxidation with chlorine or NaOCl is described in U.S. Pat. No. 4,056,469.

After the wet oxidation according to the invention, a water having an AOX content of greater than 10, preferably greater than 50 ppm, a TOC content of less than 300, preferably less than 200 ppm, a hydrazine hydrate content of less than 50, preferably less than 10 ppm and a total nitrogen content of less than 50 ppm, preferably less than 20 ppm, is obtained.

This water is already suitable for introduction into surface waters and/or biological sewage treatment plants. At higher salt contents, however, advantageously economically and preferably according to the invention, the water is fed to chlor-alkali electrolysis for production of chlorine and/or sodium hydroxide solution. Subsequently to the wet oxidation, therefore, preferably a further treatment follows in order to reduce further the content of nitrogenous organic compounds. According to the invention this is adsorption to or on an adsorbent (physical), further chemical oxidation with a gaseous oxidizing agent, or a suitable combination of these two methods.

According to the invention there is no restriction with respect to the adsorbents to be used. Not only polar but also non-polar, organic or inorganic adsorbents can come into consideration. As hydrophilic (polar) adsorbents; preferably silica gel, aluminium oxide, zeolites and some clay types come into consideration. These are suitable, in particular, for separating off polar components. As hydrophobic (non-polar) adsorbents, preferably microporous, polymeric compounds (ion exchangers, resins such as, for example, if appropriate functionalized crosslinked copolymers based on styrene and divinylbenzene), dealuminated NaY zeolites and carbon-containing or carbon-based adsorbents come into consideration. Particularly preferably, use is made of activated carbon or microporous adsorber resins owing to their hydrophobic properties for removing low-polarity pollutants and chlorinated hydrocarbons from the wastewater.

The activated carbon can be used either as granules in treatment columns or as powder. Preference is given to activated carbon in granule form which can be regenerated by generally known industrial methods, in particular thermal methods. For the activated carbons to be used there is no restriction according to the invention, in particular activated carbons based on raw materials such as bituminous coal, bituminous coal tar, biomass, sawdust or nutshells (for example walnut shells or coconut shells) come into consideration. Industrial production processes can be gathered from US 2006/0204429.

Microporous adsorber resins are obtained, for example, by carbonizing polymeric ion-exchange resins and are obtainable, for example, under the tradenames Lewatit® AF 5 from Lanxess Deutschland GmbH.

Adsorption on activated carbon or microporous adsorber resin preferably proceeds at a pH of the water of 1-8, preferably 2-6, and in particular 24. Preferably, according to the invention, the pH is adjusted with an inorganic acid, more preferably with hydrochloric acid having a TOC of less than 1000 ppm, preferably less than 700 ppm. Subsequently to the adsorption, if appropriate neutralization of the water with, preferably sodium hydroxide solution, proceeds.

As gaseous oxidizing agent, preferably oxygen or ozone, particularly preferably ozone, comes into consideration. The treatment with gaseous oxidizing agent, particularly preferably ozone, preferably proceeds at a temperature of 20-130° C., particularly preferably 60-90° C., and preferably at a pressure of 0.5-3 bar abs., particularly preferably 1-2 bar abs. Hereinafter, ozone, for the sake of simplicity, is a representative for gaseous oxidizing agents. The water fed to the ozonolysis preferably has a pH (measured at 20° C.) of 6-12, particularly preferably 7-9. According to the invention, the pH can be adjusted before, during or after ozonolysis. In the case of NaCl-containing water, preferably use is made of sodium hydroxide solution or hydrochloric acid for the adjustment.

There are no restrictions according to the invention for the ozonolysis procedure in terms of apparatus. The ozone gas is generated in a generally known ozone generator, for example a corona discharge generator, and intensely mixed with the water. As carrier gas, air or oxygen, preferably oxygen, comes into consideration. The content of ozone downstream of the generator is more than 4% by weight, preferably more than 10% by weight (WO 00/78682: 40-150 g of ozone/m³ of gas). The intense mixing with the water is of particular importance for the efficiency of ozonolysis. Industrial methods are, for example, mixing by means of impeller agitators in a reactor (U.S. Pat. No. 6,153,151), ultrasound, nozzle injectors (US 2005/0121398 A1), glass or ceramic frits or inorganic or polymeric semipermeable membranes. According to the invention the ozonolysis proceeds in a continuous or semi-continuous process. There is no restriction with respect to the duration of the ozonolysis. Preferably it is performed over a period of less than 2 hours, in particular less than 1 hour (average residence time of the water). In a continuous procedure, the treatment can proceed preferably in one or more series-connected reaction columns, as described, for example, in WO 00/78682. During or after the ozone treatment, the water can be stripped with air or steam.

Preferably, according to the invention, the treatment with ozone can be carried out before, during or after the adsorption. Particularly preferably, the treatment with ozone proceeds after the adsorption in order to eliminate completely any non-adsorbed residual portions of TOC.

In further preferred embodiments of the invention, in addition, before, during or after the treatment with ozone, a treatment of the water with hydrogen peroxide and/or UV irradiation can proceed. Particular preference is given to simultaneous treatment with ozone and UV irradiation and/or hydrogen peroxide.

After the adsorption and/or oxidation with ozone, the salt-containing water possesses
 a total nitrogen content of less than 10 ppm,
 a TOC content of less than 10 ppm, preferably less than 1 ppm, and
 an AOX content of less than 10 ppm, preferably less than 1 ppm.

At a salt content of 2-20% by weight, this water is preferably, according to the invention, fed to chlor-alkali electrolysis, in particular diaphragm or membrane electrolysis. The feed proceeds in what is termed the brine circuit preferably before or during the brine workup. The brine workup comprises, depending on electrolysis process, inter alia, the precipitation of unwanted Ca and Mg ions and other metals, filtration of the brine, if appropriate membrane filtration, if appropriate adsorption and replenishment of pure NaCl (purified rock salt) and water. According to the invention, the salt concentration of the salt-containing water according to the invention before, during or after the wet oxidation or during or after the adsorption and/or ozone treatment can be set. Preferably, the salt concentration is set to more than 16% by weight, preferably greater than 20% by weight, by means of evaporation or by feeding pure salt, before it is introduced into the brine circuit of the electrolysis.

EXAMPLES

Example 1

Wet Oxidation with Sodium Hypochlorite 9 kg of wastewater [density: 1.07 g/ml, 12% by weight NaCl, pH 12.4; TOC: 834 ppm, hydrazine hydrate: 900 ppm, 8.1 g, 0.162 mol (iodometric determination] were neutralized with hydrochloric acid. 36.4 g of 37% strength hydrochloric acid (0.37 mol) were required to achieve pH 7.08.

Subsequently, 341 g of NaOCl solution (45.04 g, 0.605 mol of NaOCl, sodium hypochlorite) were added in the form of a 13.2% strength by weight solution at 25° C. In this procedure, the redox potential increased from −557 mV to 957 mV (reference electrode Ag/AgCl). The excess of NaOCl based on the iodometric consumption for hydrazine hydrate was 73 mol % (83% by weight). A TOC of 300-400 ppm was found.

Subsequently, the water was heated to 50° C. for 0.5 h. At 25° C., a pH of 6.46 and a redox potential of 977 mV were present. By means of titrimetric determination (0.05 M $NaAsO_2$), the consumption of NaOCl was determined. 9.39 g, 0.126 mol, of NaOCl were determined. 80% by weight of the NaOCl had reacted.

In a further step, the water treated in this manner was stripped with air for 0.5 h at 95° C. In this process a condensate having 681 g was obtained, TOC: 170-251 ppm, and a residual chlorine content (calculated as NaOCl) of 0.11%.

In the bottom phase of stripping after cooling to 25° C., a pH of 4.9 and a redox potential of 1060 were measured. 0.85 g, 0.0115 mol, of NaOCl were determined, that is to say 98% by weight of the NaOCl used was consumed.

The water had a slightly chlorine-like odour and had a TOC of 184 ppm, an AOX of 79 ppm and also an $N_{tot}$ of less than 15 ppm.

Example 2

Ozonolysis

A wastewater which had been pretreated with NaOCl as described in Example 1 was treated with ozone at pH 7 and 80° C. in an ozonolysis apparatus consisting of an ozone generator, a stirred reactor, an ozone flow meter and a pH monitoring. As carrier gas, use was made of oxygen. In this process the rate of the fed ozone (g/l), the experimental period and the measurement parameters TOC, AOX and $N_{tot}$ were determined by sampling. The results are shown in Table 1.

Comparative Example 1

Ozonolysis of a Non-Pretreated Wastewater

A wastewater comparable to that used in Example 1 having a TOC of 620 ppm, which, however, had not been subjected to pretreatment using NaOCl, was likewise treated with ozone, as described in Example 2. It was found that even at a significantly higher ozone feed and longer treatment time, a TOC of less than 10 ppm could not be achieved (Table 1).

TABLE 1

| Sample | Ozone feed [g/l] | Experimental period [min] | TOC [ppm] | AOX [ppm] | N total [ppm] |
| --- | --- | --- | --- | --- | --- |
| NaOCl pretreated wastewater (Example 1) | 0 | 0 | 199 | 79 | 15 |
| 1 | 0.9 | 35 | 92 | — | — |
| 2 | 1.7 | 69 | 21 | 25 | — |
| 3 | 2.5 | 102 | 8 | — | — |
| 4 | 3.2 | 136 | 4 | 1 | — |
| 5 | 3.9 | 176 | 3 | — | — |
| 6 | 4.8 | 227 | 3 | — | 13 |
| Non-pretreated wastewater (Comparative Example 1) | 0 | 0 | 620 | — | — |
| 1 | 1.0 | 30 | 400 | — | — |
| 2 | 2.0 | 90 | 200 | — | — |
| 3 | 3.6 | 120 | 30 | — | — |
| 4 | 5.2 | 180 | 15 | — | — |

Example 3

Adsorption with Pretreatment

The water as described in Example 1, preoxidized with NaOCl, was treated in shake experiments with activated carbons (Aquacarb® 270C (Chemviron Carbon), GAC 830, ROW 0.85 Supra (both from Norith) and also 2 Lewatit® AF5 types, special microporous adsorber resins from Lanxess Deutschland GmbH. In this process, in each case 100 g of the adsorbents were admixed with 1000 ml of water from Example 1 in a cylindrical flask at pH 3-8 and kept in motion in a rolling apparatus for 48 h at 25° C., so that a thermodynamic adsorption/desorption equilibrium could be established. With all adsorbents, at a pH of less than 4 a TOC content of less than 10 ppm was achieved (FIG. 1).

Comparative Example 2

Adsorption of a Non-Pretreated Wastewater

A wastewater comparable to that used in Example 1 having TOC of 820 ppm and $N_{tot}$ of 460 ppm was, without pretreatment with NaOCl, treated by adsorption with Aquacarb® 270C, as described in Example 3. A TOC of 74 ppm and an $N_{tot}$ of 320 ppm were obtained. Even using the other adsorbents, a lower TOC was not found.

What is claimed is:

1. A process for eliminating nitrogenous organic compounds from a salt-containing water containing
   more than 0.5% by weight of salt in the form of $CaCl_2$ or NaCl,
   less than 200 ppm of dissolved carbonic acid or carbonates and
   more than 50 ppm of nitrogenous organic compounds,
   wherein the water is treated by wet oxidation at a temperature of below 100° C. with chlorine or a chlorine-containing oxidizing agent which is used more than 10% above the titrimetrically determined stoichiometric demand.

2. A process according to claim 1, wherein the salt-containing water to be treated contains more than 2% by weight of salt, less than 50 ppm of dissolved carbonic acid or carbonates and more than 150 ppm of nitrogenous organic compounds.

3. A process according to claim 1, wherein the nitrogenous organic compounds to be eliminated are from the group of azines and/or derivatives thereof.

4. A process according to claim 1, wherein the salt-containing water is additionally treated by oxidation with a gaseous oxidizing agent and/or with adsorption to or on at least one adsorbent.

5. A process according to claim 4, wherein hydrophobic adsorbents are used.

6. A process according to claim 5, wherein activated carbon or carbon-based microporous adsorber resins are used as adsorbent.

7. Process according to claims 4, wherein the gaseous oxidizing agent is oxygen or ozone.

8. A method of using salt-containing waters obtained according to claim 4 for producing chlorine and/or sodium hydroxide solution by electrolysis.

9. A method of use according to claim 8, wherein the salt concentration of the salt-containing water before, during or after the treatment is set to more than 16% by weight by means of evaporation or by feeding purified rock salt.

10. A method of use according to claim 8 or 9, wherein the electrolysis is performed by the diaphragm or membrane electrolysis process.

* * * * *